(12) United States Patent
Mohamed

(10) Patent No.: US 11,392,244 B2
(45) Date of Patent: Jul. 19, 2022

(54) TOUCH SENSING DEVICE

(71) Applicant: SILICON WORKS CO., LTD., Daejeon (KR)

(72) Inventor: Mohamed Gamal Ahmed Mohamed, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/404,814

(22) Filed: Aug. 17, 2021

(65) Prior Publication Data

US 2022/0057890 A1   Feb. 24, 2022

(30) Foreign Application Priority Data

Aug. 19, 2020   (KR) ........................ 10-2020-0103672

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ................................................ G06F 3/041–047
See application file for complete search history.

(56) References Cited

U.S. PATENT DOCUMENTS

| | | | |
|---|---|---|---|
| 9,690,432 B2 | 6/2017 | Yao et al. | |
| 2014/0204053 A1 | 7/2014 | Crandall | |
| 2015/0301631 A1* | 10/2015 | Mirfakhraei | G06F 3/044 345/173 |
| 2016/0034080 A1* | 2/2016 | Lee | G06F 3/04166 345/174 |
| 2016/0202839 A1* | 7/2016 | Hwang | G06F 3/04166 345/174 |
| 2020/0050297 A1* | 2/2020 | Jiang | G06F 3/044 |

* cited by examiner

*Primary Examiner* — Michael Pervan
(74) *Attorney, Agent, or Firm* — Fenwick & West LLP

(57) ABSTRACT

An embodiment may encode a driving signal and decode a response signal with the same random code, thereby eliminating noise that occurs in sensing a touch and reducing electromagnetic interference with peripheral circuits.

15 Claims, 13 Drawing Sheets

TOUCH SENSING DEVICE

CROSS REFERENCE TO RELATED APPLICATION

This application claims priority from Republic of Korea Patent Application No. 10-2020-0103672, filed on Aug. 19, 2020, which is hereby incorporated by reference in its entirety.

BACKGROUND

1. Field of Technology

The present disclosure relates to a technology for sensing a touch or proximity of an external object.

2. Description of the Prior Art

Position sensors are commonly used as input devices for computers, personal digital assistants (PDAs), media players, video game players, home appliances, cordless phones, pay phones, POS (point of sales) terminals, automatic teller machines, and the like. One of the position sensors used in such applications is a touch sensor, which is normally provided in input devices of notebook computers, smartphones, and the like. Users move a finger, a stylus, or another object near the sensing area of the touch sensor, thereby operating the touch sensor. The object may generate a capacitive or inductive effect, or other electrical effects on the carrier signal applied to the detection area, and the position or proximity of the object to the detection area may be detected through the carrier signal. Position information detected by the touch sensor may be used to move a cursor or other indicators on a display screen or scroll text elements on the screen, or may be used for the purpose of other user interfaces.

Although touch sensors have been used for several years, engineers continue to seek design alternatives for reducing cost and improving the performance of touch sensors. In particular, considerable attention has recently been paid to reducing the effects of noise generated by a display screen, a power source, radio frequency interference, and/or other sources outside the sensor. Various sampling, filtering, signal processing, shielding, and noise reduction techniques have been implemented with varying degrees of success.

Accordingly, it is necessary to provide a system and method for quickly, effectively, and efficiently detecting the position-based characteristics of an object in a situation in which noise is involved. Preferred features in this regard will become apparent in the description and claims taken in conjunction with the drawings and the background of the related art.

SUMMARY OF THE INVENTION

Against this background, an aspect of the present disclosure is to provide a touch sensing technology for encoding a driving signal with a random code used to decode a response signal to change the spectrum of the driving signal to have a low and wide bandwidth.

Another aspect of the present disclosure is to provide a touch sensing technology for decoding a response signal with a random code used to encode a driving signal to change the spectrum of noise to have a low and wide bandwidth.

In order to solve the above-described problems, in an aspect, the present disclosure provides a touch sensing device comprising: a driving circuit configured to generate a driving signal encoded with a random code and transmit the driving signal to a touch electrode; a receiving circuit configured to receive a response signal to the driving signal from the touch electrode; and a processing circuit configured to generate a decoded response signal by decoding the response signal with the same random code as that used in the encoding and generate touch data indicating a touch position from the decoded response signal.

In the device, a bandwidth of the driving signal may be widened through the encoding, and the decoded response signal may have a narrower bandwidth than the driving signal.

In the device, the driving signal may have a wider bandwidth than noise occurring in the process of sensing a touch, and the decoded response signal may have a narrower bandwidth than the noise.

In the device, the readout circuit may include an integrator configured to transmit a value obtained by integrating the response signal to the analog-to-digital converter, and the integrator may be reset before an edge of the encoded driving signal.

In another aspect, the present disclosure provides a touch sensing device comprising: a driving circuit configured to generate a driving signal encoded with a random code and transmit the driving signal to a first touch electrode and a second touch electrode crossing the first touch electrode; a receiving circuit configured to receive a response signal to the driving signal from the first touch electrode and the second touch electrode; and a processing circuit configured to generate a decoded response signal by decoding the response signal with the same random code as that used in the encoding and generate touch data indicating a touch position from the decoded response signal.

As described above, according to the present disclosure, it is possible to eliminate noise occurring in sensing a touch by changing the spectrum of noise to have a low and wide bandwidth through decoding of a response signal.

In addition, according to the present disclosure, it is possible to reduce electromagnetic (EM) interference of a driving signal with respect to the peripheral circuits by changing the spectrum of the driving signal to have a low and wide bandwidth through encoding of the driving signal.

In addition, according to the present disclosure, it is possible to increase the speed of sensing a touch by reducing noise to attain a high signal-to-noise ratio (SNR).

In addition, according to the present disclosure, since any random code can be used for encoding and decoding and since decoding is performed in a digital domain, the circuit can be simplified and easily configured.

Further, according to the present disclosure, since noise is removed by decoding in a digital circuit, the power consumed by an analog circuit can be reduced.

DETAILED DESCRIPTION OF THE EXEMPLARY EMBODIMENTS

Figure 1:
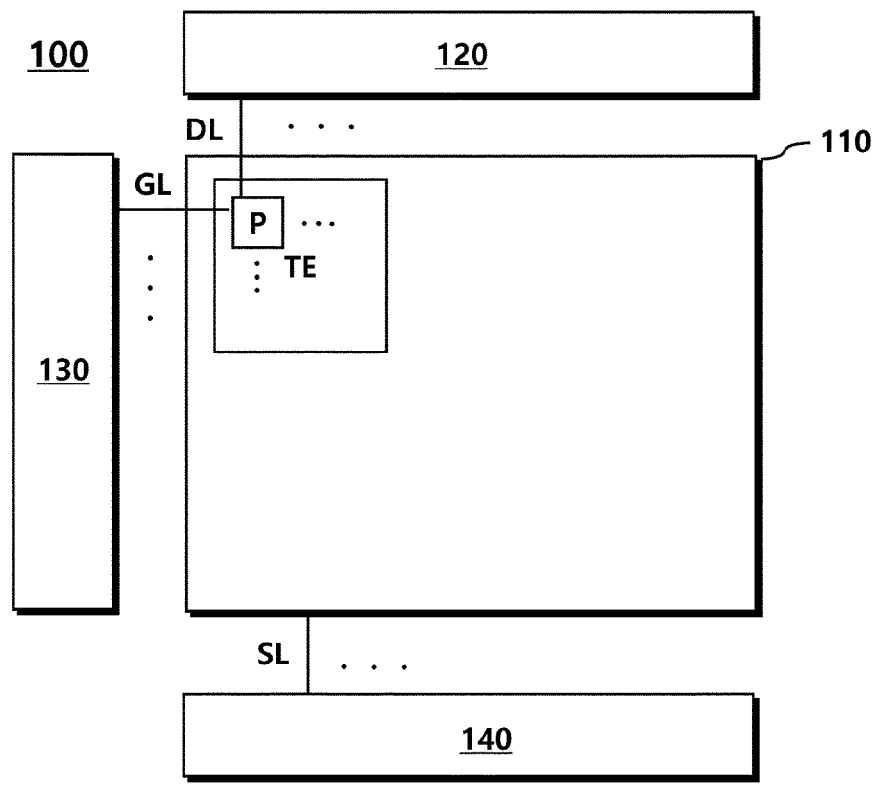
FIG. 1 is a diagram illustrating the configuration of a display device according to an embodiment.

FIG. 1 is a diagram illustrating the configuration of a display device according to an embodiment.

Referring to FIG. 1, a display device 100 includes a panel 110, a data driving device 120, a gate driving device 130, a touch sensing device 140, and the like.

The panel 110 may have a plurality of data lines DL formed thereon to be connected to the data driving device 120 and a plurality of gate lines GL formed thereon to be connected to the gate driving device 130. In addition, the panel 110 may have a plurality of pixels P defined to correspond to intersections of the plurality of data lines DL and the plurality of gate lines GL.

Each of the pixels P may have a transistor formed thereon to have a first electrode (e.g., a source electrode or a drain electrode) connected to the data line DL, a gate electrode connected to the gate line GL, and a second electrode (e.g., a drain electrode or source electrode) connected to a display electrode.

In addition, a plurality of touch electrodes TE may be further formed to be spaced apart from each other on the panel 110. A single pixel P or a plurality of pixels P may be located in the region where the touch electrode TE is located.

The panel 110 may include a display panel and a touch screen panel (TSP), and the display panel and the touch screen panel may share some elements with each other. For example, the plurality of touch electrodes TE may be one configuration of the touch screen panel (a touch electrode for sensing a touch), as well as one configuration of the display panel (e.g., a common electrode for applying a common voltage). The panel 110 may be called an "integrated panel" because some elements thereof are shared by the display panel and the touch panel, but the present disclosure is not limited thereto. In addition, although an in-cell type panel is known as a form in which some elements of the display panel and the touch screen panel are shared with each other, this is only an example of the aforementioned panel 110, and the panel to which the present disclosure is applied is not limited to the in-cell type panel.

The data driving device 120 supplies data signals to the data lines DL in order to display an image in each pixel P of the panel 110.

The data driving device 120 may include at least one data driver integrated circuit, and the at least one data driver integrated circuit may be connected to a bonding pad of the panel 110 by a tape automated bonding (TAB) type or a chip-on-glass (COG) type, or may be formed directly on the panel 110, or, in some cases, may be formed to be integrated to the panel 110. In addition, the data driving device 120 may be implemented by a chip-on-film (COF) type.

The gate driving device 130 sequentially supplies scan signals to the gate lines GL in order to turn on or off the transistors located in the respective pixels P.

The gate driving device 130 may be positioned on only one side of the panel 110 as shown in the drawing, or may be positioned on both sides of the panel 110 by being divided into two parts, depending on the driving method thereof.

In addition, the gate driving device 130 may include at least one gate driver integrated circuit, and the at least one gate driver integrated circuit may be connected to a bonding pad of the panel 110 by a tape automated bonding (TAB) type or a chip-on-glass (COG) type, may be implemented by a gate-in-panel (GIP) type to be formed directly on the panel 110, or, in some cases, may be formed to be integrated to the panel 110. In addition, the gate driving device 130 may be implemented by a chip-on-film (COF) type.

The touch sensing device 140 applies driving signals to all or some of the plurality of touch electrodes TE connected to sensing lines SL.

Although the touch sensing device 140 may be configured outside the data driving device 120 and the gate driving device 130 so as to be separate from the data driving device 120 and the gate driving device 130 as shown in the drawing, the touch sensing device 140 may be implemented as an internal element of another separate driver integrated circuit including at least one of the data driving device 120 and the gate driving device 130, or may be implemented as an internal element of the data driving device 120 or the gate driving device 130 depending on the implementation method.

Therefore, the operation of the touch sensing device 140 applying a driving signal to all or some of the plurality of touch electrodes TE may be regarded as an operation of a separate driver integrated circuit including the touch sensing device 140 and applying a driving signal to all or some of the plurality of touch electrodes TE. In addition, depending on the design method, the data driving device 120 or the gate driving device 130 including the touch sensing device 140 may apply a driving signal to all or some of the plurality of touch electrodes TE.

The touch sensing device 140 is not limited to a specific implementation and design method, and may be another element itself or may be an element provided inside or outside another element, as long as the same or a similar function as that described herein is performed.

In addition, although one touch sensing device 140 is illustrated as being provided in the display device 100 in the drawing, the display device 100 may include two or more touch sensing devices 140.

Meanwhile, in order for the touch sensing device 140 to apply driving signals to all or some of the plurality of touch electrodes TE, sensing lines SL are required to be respectively connected to the plurality of touch electrodes TE. Accordingly, the sensing lines SL, which are connected to the plurality of touch electrodes TE and transmit driving signals thereto, may be formed on the panel 110 in a first direction (e.g., a vertical direction) or a second direction (e.g., a horizontal direction).

Meanwhile, the display device 100 may employ a capacitive method of recognizing the proximity or touch of an object by sensing a change in capacitance through the touch electrode TE.

The capacitive method may be divided into, for example, a mutual capacitance method and a self-capacitance method. According to an embodiment, the touch sensing device 140 may adopt a mutual capacitance method.

In the self-capacitance method that is a type of capacitance method, a driving signal is applied to one touch electrode TE, and then the corresponding touch electrode TE is sensed. In the self-capacitance method, a value sensed by a corresponding touch electrode TE varies depending on the proximity or touch of an object such as a finger, a pen, or the like. In the self-capacitance method, the presence or absence of a touch, touch coordinates, and the like are detected using the sensed value. The self-capacitance method makes no distinction between a Tx electrode and an Rx electrode because the touch electrode TE for applying the driving signal and the touch electrode TE for sensing are the same.

Figure 2:
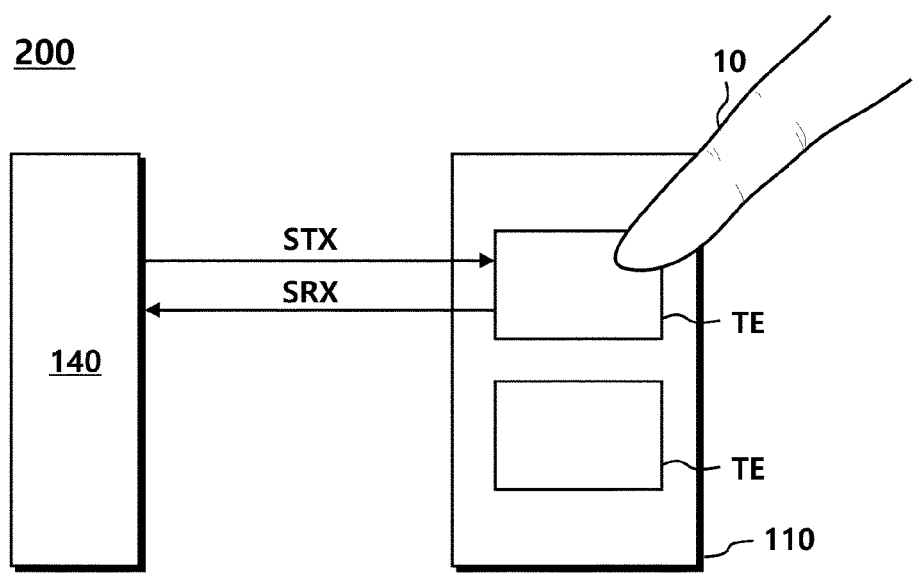
FIG. 2 is a diagram schematically illustrating a touch sensing system according to an embodiment.

FIG. 2 is a diagram schematically illustrating a touch sensing system according to an embodiment.

Referring to FIG. 2, a touch sensing system 200 may include a panel 110 and a touch sensing device 140.

A plurality of touch electrodes TE may be arranged on the panel 110.

The touch sensing device 140 may supply a driving signal STX to the touch electrode TE. The driving signal STX may be a signal in the form of a voltage or current, and the driving signal STX in the form of a voltage may be defined as a driving voltage. The driving signal may include one driving period including a first period and a second period.

The touch sensing device 140 may receive a response signal SRX to the driving signal STX from the touch electrode TE and demodulate the response signal SRX, thereby sensing the touch or proximity of an object 10 with respect to the panel 110. The response signal SRX may be a signal in the form of a current or voltage.

Figure 3:
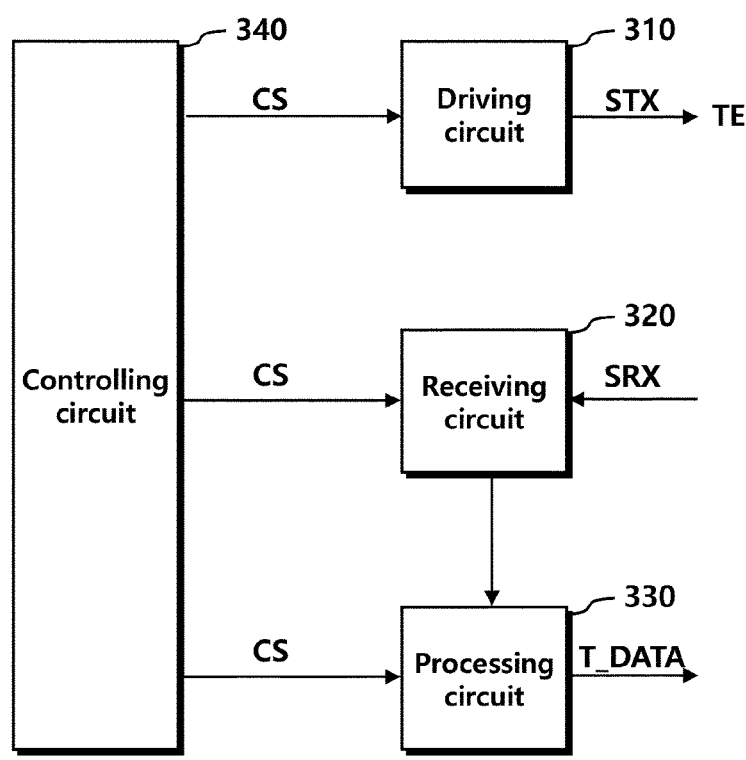
FIG. 3 is a diagram illustrating the configuration of a touch sensing device according to an embodiment.

FIG. 3 is a diagram illustrating the configuration of a touch sensing device according to an embodiment.

Referring to FIG. 3, a touch sensing device 140 may include a driving circuit 310, a receiving circuit 320, and a processing circuit 330, and may further include a controlling circuit 340 for controlling the driving circuit 310, the receiving circuit 320, and the processing circuit 330.

The driving circuit 310 may supply a driving signal STX to the touch electrode TE. The driving circuit 310 may generate a driving signal encoded with a random code.

The receiving circuit 320 may receive a response signal SRX to the driving signal STX from the touch electrode and perform pre-processing for generating touch data including a touch position from the response signal SRX.

Specifically, the receiving circuit 320 may convert the response signal SRX to have a stable level and then transmit the same to the processing circuit 330. The receiving circuit 320 may convert the charge, voltage or current of the response signal SRX through a readout circuit, thereby generating an analog voltage signal with a stable level. The receiving circuit 320 may convert the level of the analog voltage signal through the analog-to-digital converter, thereby generating a digital signal.

The processing circuit 330 may generate touch data including a touch position based on the response signal SRX. Specifically, the processing circuit 330 may receive the digitally converted response signal SRX from the receiving circuit 320 and decode the same.

The processing circuit 330 may generate a decoded response signal by decoding the response signal with the same random code as that used in the encoding and generate touch data indicating a touch position from the decoded response signal.

The controlling circuit 340 may transmit timing signals CS to the driving circuit 310, the receiving circuit 320, and the processing circuit 330. In addition, the driving circuit 310, the receiving circuit 320, and the processing circuit 330 may transmit driving signals STX according to the timing signal, receive a response signal SRX, and generate touch data T_DATA including touch coordinates from the response signal SRX.

Figure 4:
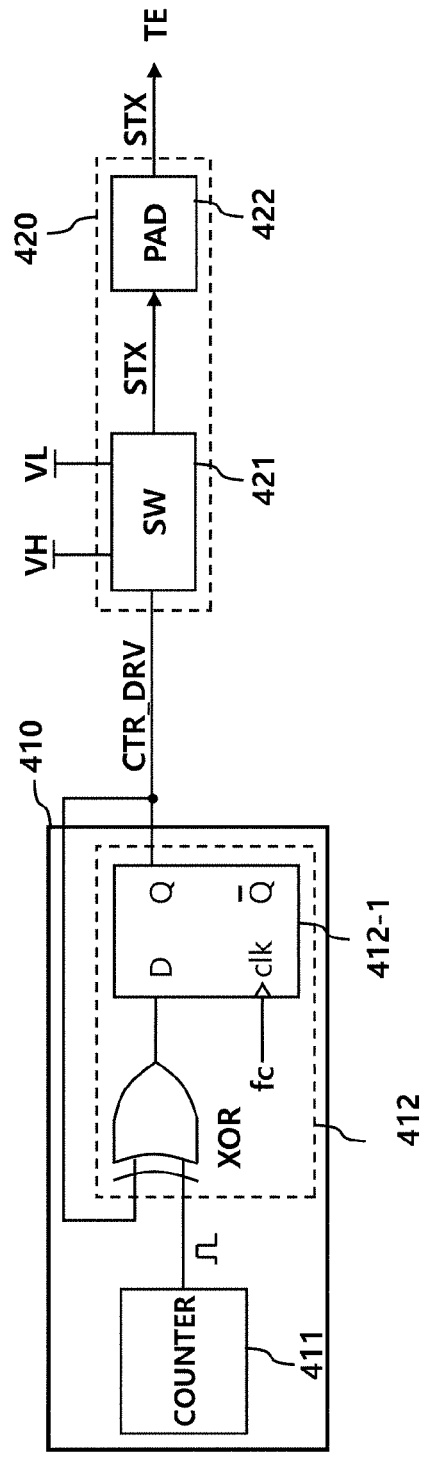
FIG. 4 is a diagram illustrating a first example of the configuration of a driving circuit of a touch sensing device according to an embodiment.

FIG. 4 is a diagram illustrating a first example of the configuration of a driving circuit of a touch sensing device according to an embodiment.

Referring to FIG. 4, a driving circuit 310 may include a driving controlling circuit 410 and a driving channel 420. In addition, the driving channel 420 may include a switching circuit 421 and an output pad 422.

A high driving voltage VH and a low driving voltage VL may be connected to the switching circuit 421, and the switching circuit 421 may selectively output the high driving voltage VH or the low driving voltage VL depending on a driving control signal CTR_DRV supplied from the driving controlling circuit 410. The voltage output from the switching circuit 421 may form a driving signal STX, and the driving signal STX may be supplied to the touch electrode TE through the output pad 422.

The driving controlling circuit 410 may include a square-wave generating circuit 411 and a T flip-flop 412. The square-wave generating circuit 410 may be configured as a counter, and may output a square wave having a first control frequency to the T flip-flop 412. In addition, the T flip-flop 412 may have a clock having a second control frequency, an input connected to the square-wave generating circuit 411, and a Q output connected to the driving channel 420. The T flip-flop 412 may include an eXclusive OR (XOR) logic element and a D flip-flop 412-1. A Q output of the D flip-flop 412-1 may be connected to one input terminal of the XOR logic element, and an output of the square-wave generating circuit 411 may be connected to the other input terminal of the XOR logic element.

According to this configuration, the T flip-flop 412 may supply, to the driving channel 420, a square wave having a specific frequency corresponding to the product of the first control frequency and the second control frequency. A specific frequency of the square wave may be used as a switching frequency of the switching circuit 421 by the driving controlling circuit 410, and may lead to the frequency of the driving signal STX. The driving controlling circuit 410 may adjust the frequency of the driving signal STX by controlling the first control frequency and the second control frequency.

The driving controlling circuit 410 may adjust the frequency of the driving signal STX by controlling the switching frequency of the switching circuit 421 through the driving control signal CTR_DRV. The frequency of the driving signal STX may be determined by the frequency of the driving control signal CTR_DRV, and when the driving controlling circuit 410 switches the switching circuit 421 according to the frequency of the driving control signal CTR_DRV, the driving signal STX also has the same frequency. The switching frequency of the switching circuit 421 (the frequency of the driving control signal CTR_DRV)

may be the same as a specific frequency of the square wave output from the T flip-flop 412.

Figure 5:
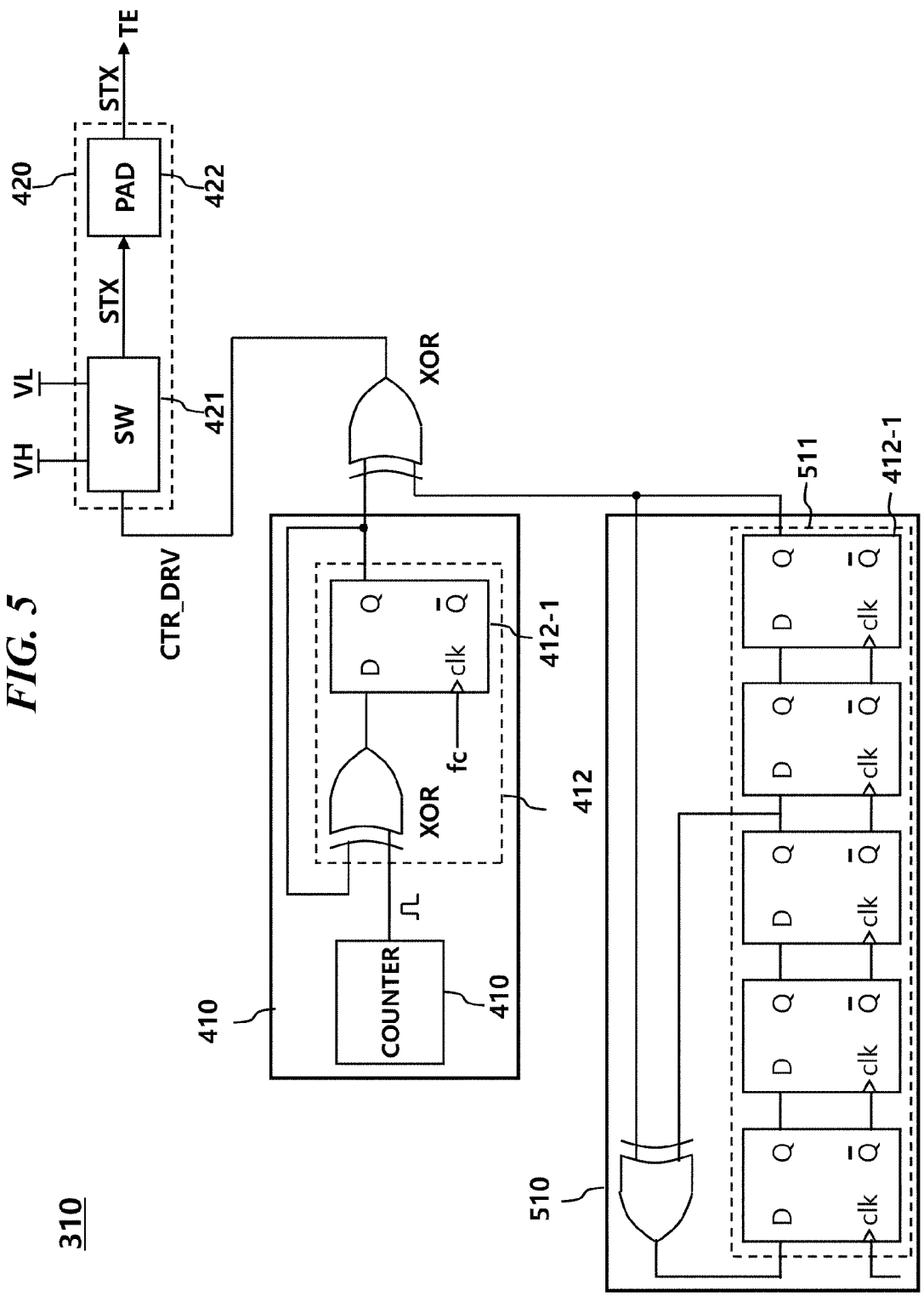
FIG. 5 is a diagram illustrating a second example of the configuration of a driving circuit of a touch sensing device according to an embodiment.

FIG. 5 is a diagram illustrating a second example of the configuration of a driving circuit of a touch sensing device according to an embodiment.

Referring to FIG. 5, a driving circuit 310 may further include a code generating circuit 510.

The code generating circuit 510 may generate a code required for encoding the driving signal STX. Here, the code may include a pseudo random code (hereinafter, referred to as a "random code"). The random code may be understood as the sequence or progression including specific values. Although the random code looks irregular, actually, it may have regularity. For example, the random code may be configured as a binary value of 1 or 0, and may be a set of 1s or 0s repeated in a certain rule. For example, the random code may include a maximum length sequence (MLS) code, a Barker code, or a gold code, but is not limited thereto, and may include any type of code having similar properties.

The random code may assign a constant code value to the encoded driving signal STX. When the driving signal STX is encoded, 1 or 0 may be assigned to each period, and the driving signal STX may have a sequence including 1 or 0 over the entire period.

The code generating circuit 510 may include a shift register 511 including cascaded D flip-flops 412-1 to generate the random code (e.g., the MLS code). The output of the shift register 511 may be fed back (input) to the input of the shift register 511 through the XOR logic element. The input of the XOR logic element may be connected to any one of the cascaded D flip-flops 412-1. The length of the random code (e.g., the MLS code) may vary depending on the length of the shift register 511, i.e., the number of cascaded D flip-flops 412-1.

The XOR logic element of the driving circuit 310 may include a random code in the driving signal STX. One input terminal of the XOR logic element may be connected to the Q output of the T flip-flop 412 of the driving controlling circuit 410, and the other input terminal may be connected to the output of the code generating circuit 510. A square wave having a specific frequency generated by the square-wave generating circuit 411 may be input to one input terminal of the XOR logic element, and a random code value may be input to the other input terminal. The XOR logic element may output a driving control signal CTR_DRV reflecting the random code value. The driving circuit 310 may control the switching on-off sequence of the switching circuit 421 depending on the frequency of the square wave and the random code value through the driving control signal CTR_DRV, thereby generating a driving signal STX.

Figure 6:
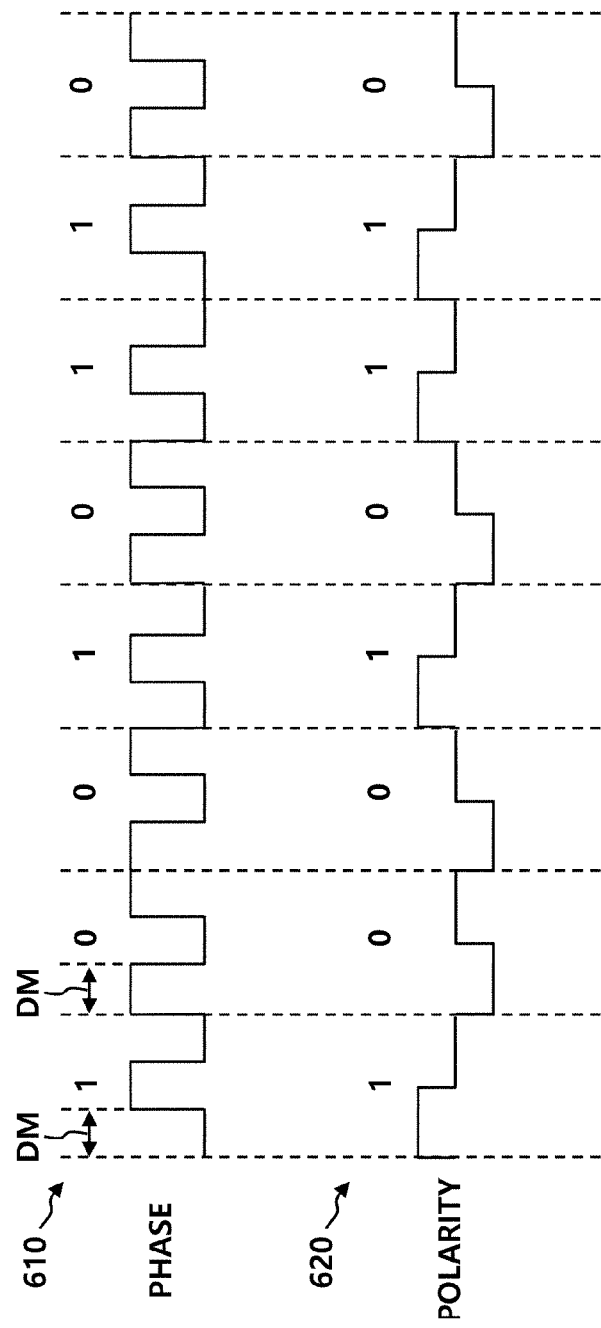
FIG. 6 is a diagram illustrating an example of an encoded driving signal according to an embodiment.

FIG. 6 is a diagram illustrating an example of an encoded driving signal according to an embodiment.

FIG. 6 shows an exemplary waveform of the encoded driving signal.

The driving circuit may generate driving signals having different phases depending on the random code value. A first waveform 610 may represent such a driving signal (see PHASE).

For example, the driving circuit may generate the driving signal from the square wave, and the driving signal may have a square wave form. The driving circuit may adjust the phase of the square wave in order for the driving signal to represent 1 or 0. The square wave representing 0 in the drawing may have the form obtained by adjusting the phase to be earlier or later by a predetermined amount than the square wave representing 1. The driving circuit may adjust the phase such that each period represents 1 or 0, so that the driving signal has a random code that is a set of 1s or 0s over the entire period. The driving signal, like the first waveform 610, may have the square wave form and a random code value "10010110".

In addition, when encoding the driving signal through the change in the phase, the driving circuit may form a dummy section DM between adjacent pulses. The dummy section DM may provide the time margin for receiving a response signal. That is, since transitions frequently appear in the driving signal encoded through the change in the phase, an incorrect signal may be received when receiving the response signal (when integrating the response signal). In order to prevent this, the receiving circuit may reset the integrator to prepare for reception in the dummy section DM, thereby receiving a complete signal.

The driving circuit may generate driving signals having different amplitudes depending on the random code value. A second waveform 620 may represent such a driving signal (see POLARITY).

For example, the driving circuit may generate a driving signal from the square wave, and the driving signal may have a square wave form. The driving circuit may adjust the amplitude of the square wave such that the driving signal represents 1 or 0. In the drawing, the square wave representing 0 may have a form in which the amplitude thereof is adjusted to be lower than that of the square wave representing 1. Specifically, the square waves representing 1 and 0 may have vertically symmetric amplitudes. The driving circuit may adjust the amplitude such that each period represents 1 or 0, so that the driving signal has a random code that is a set of 1s or 0s over the entire period. The driving signal, like the second waveform 620, may have the square wave form and a random code value "10010110".

Figure 7:
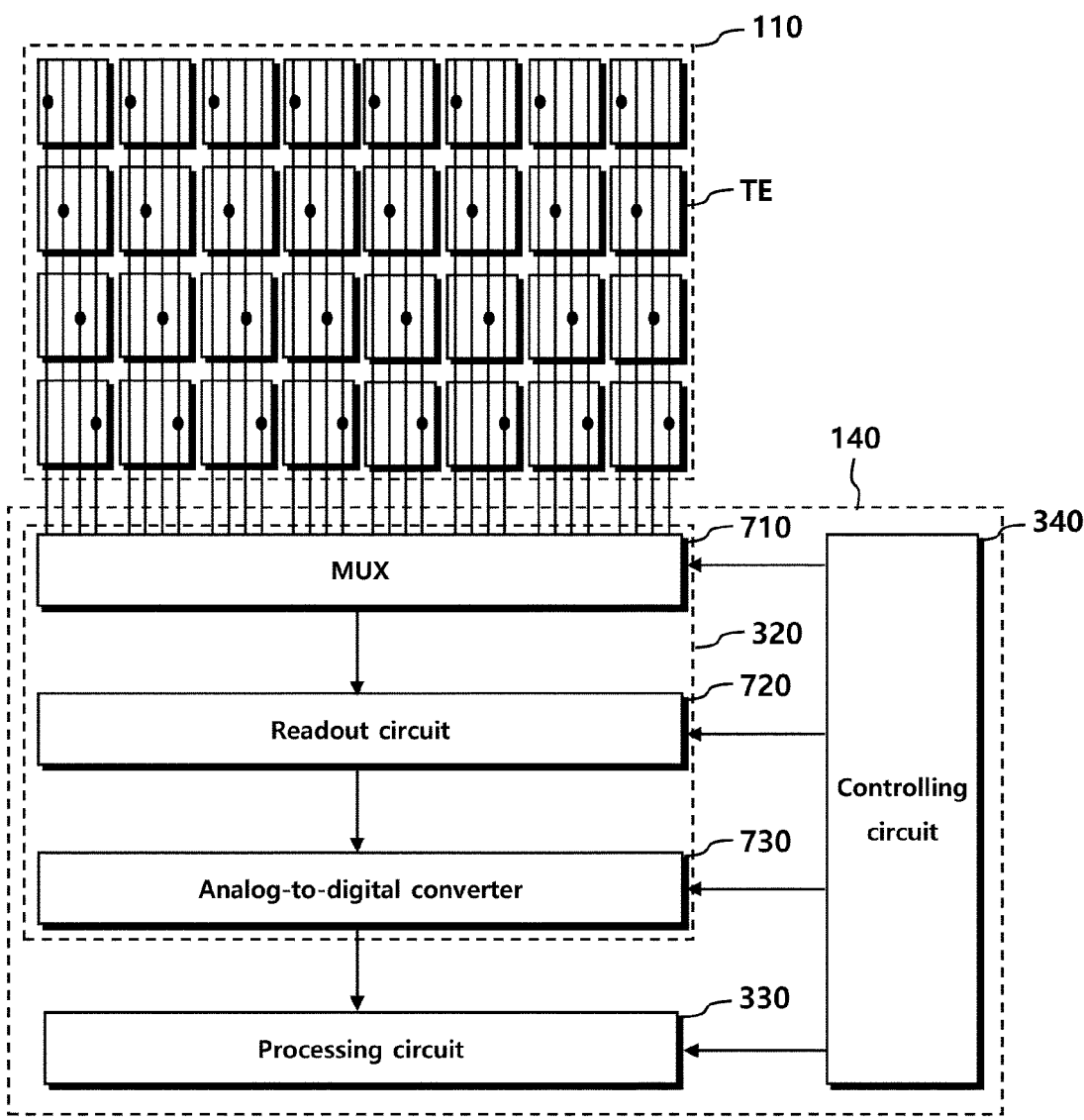
FIG. 7 is a diagram illustrating the configuration of a touch sensing system having a first touch electrode structure according to an embodiment.

FIG. 7 is a diagram illustrating the configuration of a touch sensing system having a first touch electrode structure according to an embodiment.

Referring to FIG. 7, the touch sensing system 200 may have a first touch electrode structure for sensing a touch in the self-capacitance method. A transmission electrode receiving a driving signal and a reception electrode outputting a response signal are not distinguished in the first touch electrode structure. A single touch electrode TE for both the driving signal and the response signal may be formed on the panel 110. The touch electrode TE may receive the driving signal and transmit the response signal. The touch electrode TE may be selectively sensed by the touch sensing device 140.

The touch sensing device 140 may include a receiving circuit 320, a processing circuit 330, and a controlling circuit 340. The receiving circuit 320 may include a MUX 710, a readout circuit 720, and an analog-to-digital converter 730.

The MUX 710 may select a plurality of touch electrodes TE for sensing a touch. A driving signal may be supplied to the selected touch electrode TE, and the receiving circuit 320 may receive a response signal for the selected touch electrode TE.

The readout circuit 720 may analog-convert a response signal, and may include a circuit such as an integrator or the like. The readout circuit 720 may generate an analog-converted response signal.

The analog-to-digital converter 730 may digitally convert the analog-converted response signal to generate sensing data.

The processing circuit 330 may decode the digital response signal (i.e., sensing data) and generate touch data including a touch position from the decoded response signal.

Figure 8:
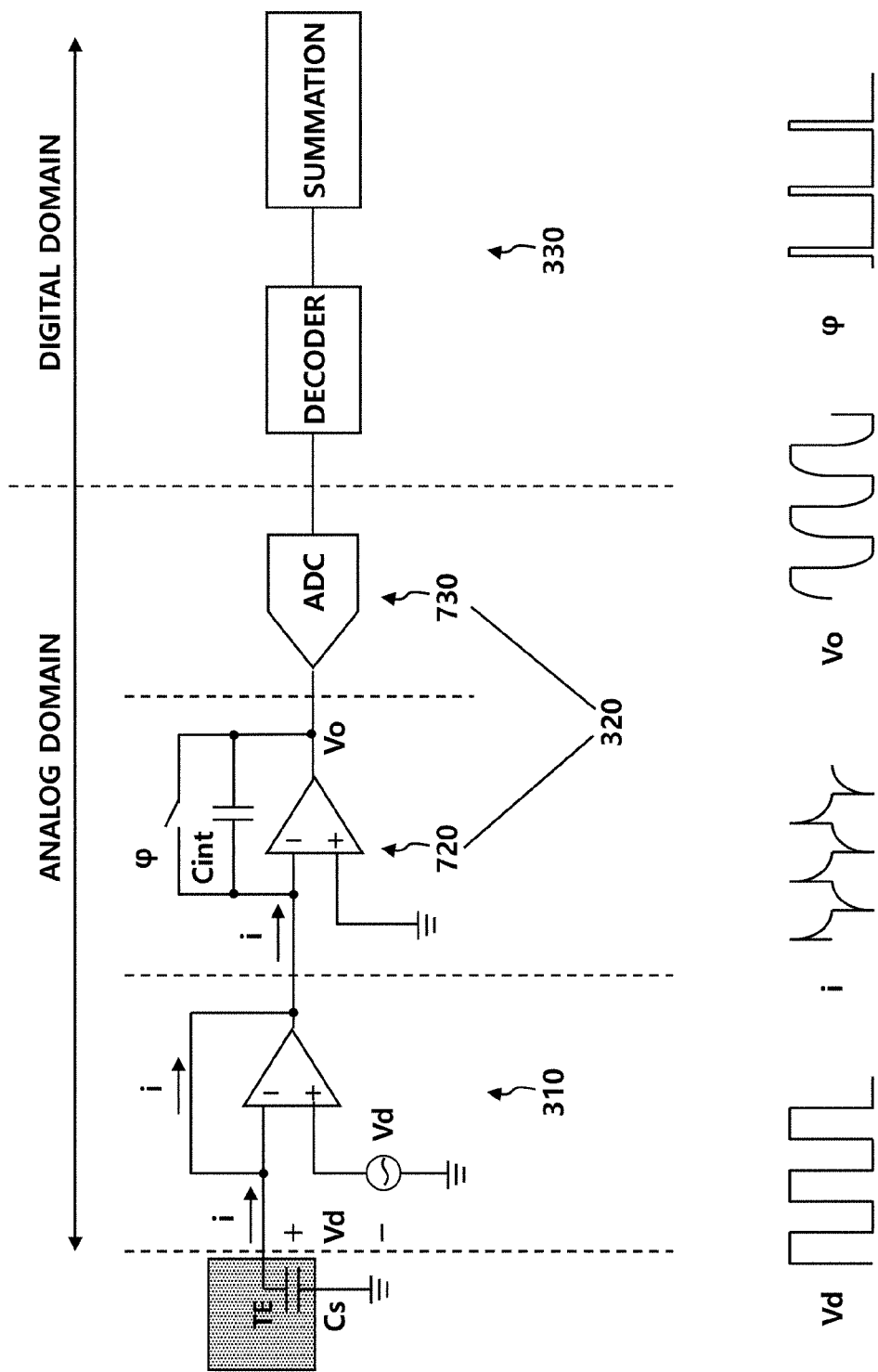
FIG. 8 is a diagram illustrating the flow of a signal in a touch sensing system according to an embodiment.

FIG. 8 is a diagram illustrating the flow of a signal in a touch sensing system according to an embodiment.

Referring to FIG. 8, a touch sensing process may be divided into an analog domain and a digital domain.

In the analog domain, processes of supplying a driving signal to the touch electrode TE, receiving a response signal from the touch electrode TE, analog-converting the response signal, and digitally converting the analog-converted response signal to generate sensing data may be performed (ANALOG DOMAIN).

The driving signal may have a square wave voltage Vd. The driving circuit 310 may generate a driving signal encoded with a random code to have a square wave voltage Vd. The driving circuit 310 may transmit the driving signal to the touch electrode TE by applying the driving signal to one terminal of a driving amplifier (buffer).

In addition, the response signal may have a spike-shaped current i. When a driving signal is supplied to the touch electrode TE, a response signal including a change in capacitance of a capacitor Cs of the touch electrode TE may be generated. The response signal may be input to the readout circuit 720 of the receiving circuit 320 through the driving amplifier (buffer).

In addition, the analog-converted response signal may have a voltage Vo obtained by integrating the spike-shaped current i. The response signal may be integrated by the integrator of the readout circuit 720. The readout circuit 720 may generate an analog-converted response signal by integrating the spike-shaped current i.

The readout circuit 720 may include a switch for resetting the integrator, and may reset the integrator periodically or according to a reset signal φ. When the integrator is reset, the integration capacitor Cint may be discharged.

The analog-to-digital converter 730 may digitally convert the analog-converted response signal to generate sensing data.

On the other hand, in the digital domain, sensing data may be decoded, and a summation operation may be performed on the decoded sensing data (DIGITAL DOMAIN).

The processing circuit 330 may decode the sensing data with a random code through a decoder. The random code may be the same as that used to encode the driving signal. Accordingly, the random code for decoding may also include a maximum length sequence (MLS) code, a Barker code, or a gold code, but is not limited thereto, and may include any type of code having similar properties.

The processing circuit 330 may perform a summation operation on the decoded sensing data (i.e., the decoded response signal) through a summation unit.

According to an embodiment, since the decoding process is performed in the digital domain rather than the analog domain, the circuit can be simplified. In addition, the circuits for driving the touch electrodes are integrated to the analog domain, which causes high power consumption. Since the decoding is performed in the digital domain, power consumption of the analog circuit may not be increased.

Figure 9:
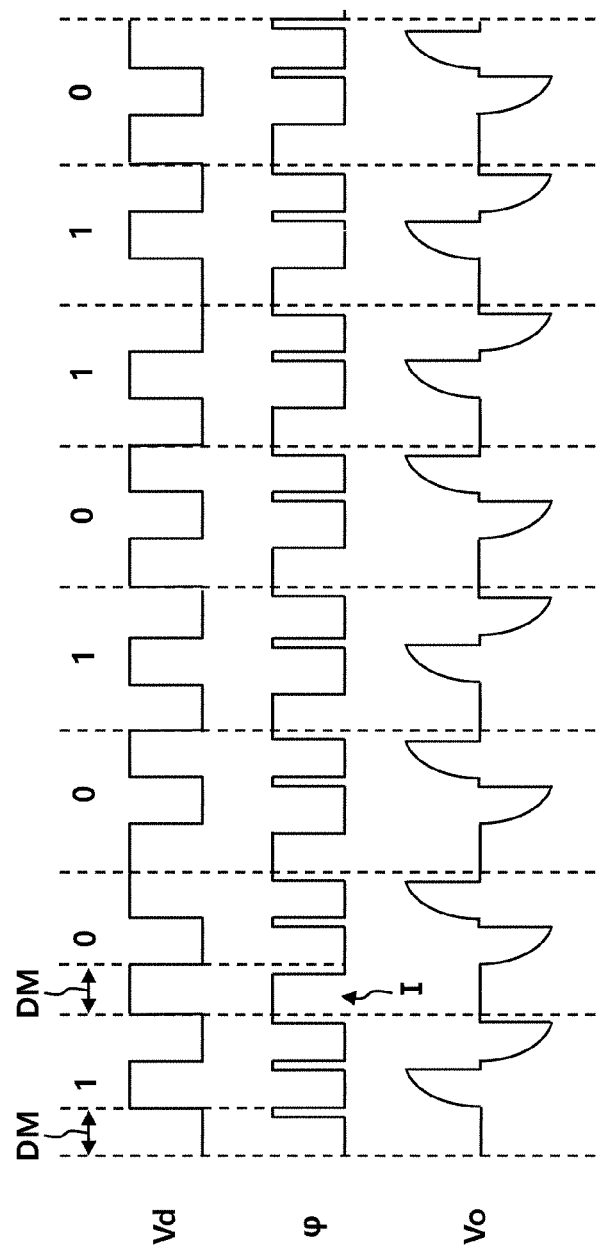
FIG. 9 is a diagram illustrating a first example of a response signal to an encoded driving signal according to an embodiment.

FIG. 9 is a diagram illustrating a first example of a response signal to an encoded driving signal according to an embodiment.

FIG. 9 shows a driving signal encoded with a random code and a response signal to the driving signal. The driving signal may have a square wave voltage Vd, and hereinafter, the driving signal having the square wave voltage may be referred to as a "driving voltage signal Vd". The response signal may be analog-converted by a readout circuit, and hereinafter, the response signal which has passed through the readout circuit may be referred to as an "analog-converted response signal Vo". The response signal may pass through an integrator of the readout circuit, and hereinafter, the signal for resetting the integrator may be referred to as a "reset signal φ".

The response signal corresponding to the driving voltage signal Vd encoded with a random code is received by the touch sensing device and passes through the integrator of the readout circuit, thereby becoming an analog-converted response signal Vo. The analog-converted response signal Vo may depend on the accumulation of charge in the capacitor of the integrator. When the driving voltage signal Vd transitions, the charges may be accumulated in the capacitor of the integrator, and the analog-converted response signal Vo may also rise. The amplitude or the polarity of the analog-converted response signal Vo may also vary according to whether the transition of the driving voltage signal Vd is rising or falling. The analog-converted response signal Vo may have a positive amplitude or polarity in the rising transition of the driving voltage signal Vd. The analog-converted response signal Vo may have a negative amplitude or polarity in the falling transition of the driving voltage signal Vd.

The integrator may be reset according to the reset signal φ, and the capacitor of the integrator may be discharged. The integrator may be temporarily reset before the driving voltage signal Vd transitions. However, in the case where the driving voltage signal Vd is encoded through a change in the phase, the integrator may be reset during all or a portion of the dummy section DM for every period, and the reset signal φ may define a reset operation of the integrator (see I). Preferably, whenever the value of the random code is changed, the dummy section DM may exist, and the integrator may be reset during all or a portion of the dummy section DM.

Figure 10:
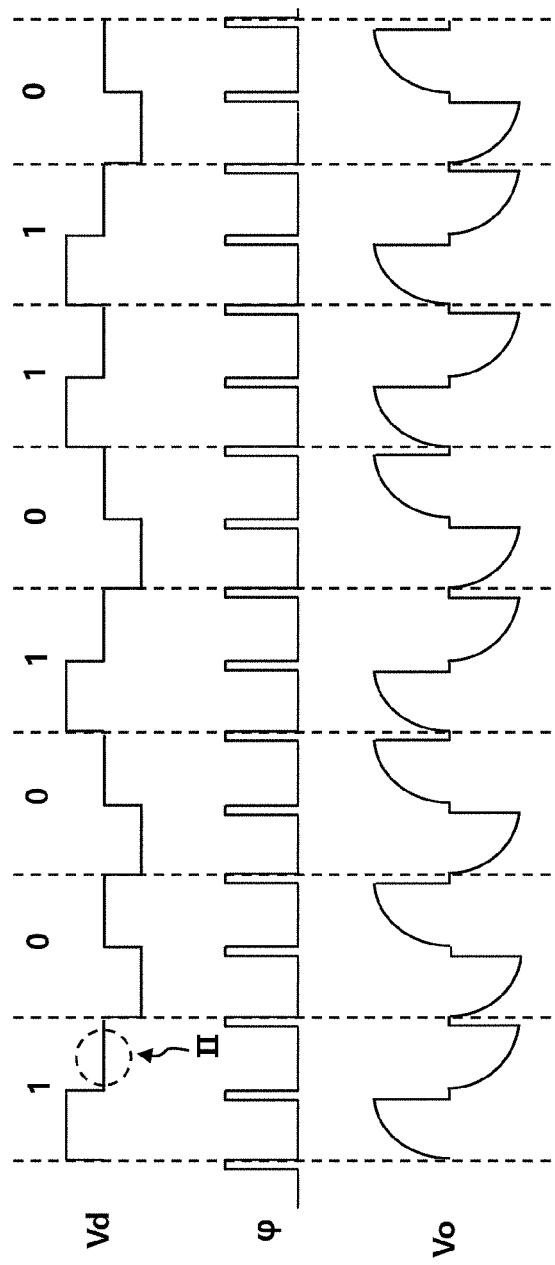
FIG. 10 is a diagram illustrating a second example of a response signal to an encoded driving signal according to an embodiment.

FIG. 10 is a diagram illustrating a second example of a response signal to an encoded driving signal according to an embodiment.

Referring to FIG. 10, the driving voltage signal Vd may be encoded through a change in an amplitude or a polarity. As described above, the analog-converted response signal Vo may have a positive amplitude or a negative amplitude according to the transition of the driving voltage signal Vd. Otherwise, the analog-converted response signal Vo may have a positive polarity or a negative polarity according to the transition of the driving voltage signal Vd.

However, the integrator may not be reset in the section defined by the reset signal φ in the dummy section DM. Although the integrator is reset according to the reset signal φ, the integrator may be reset for a short period of time before the driving voltage signal Vd transitions. The integrator may discharge the capacitor. If the driving voltage signal Vd is encoded through a change in the amplitude, a blank may occur in the driving voltage signal Vd whenever the value of the random code is changed.

For example, in the driving voltage signal Vd, a first level (e.g., a positive amplitude) may represent a random code value of 1, and a second level (e.g., a negative amplitude) may represent a random code value of 0. Additionally, a third level may be provided between the first and second levels, and the third level may occur whenever the value of the random code is changed (see II). Accordingly, unlike the case of encoding the driving signal through a change in the phase, the dummy section DM does not need to be formed separately.

Figure 11:
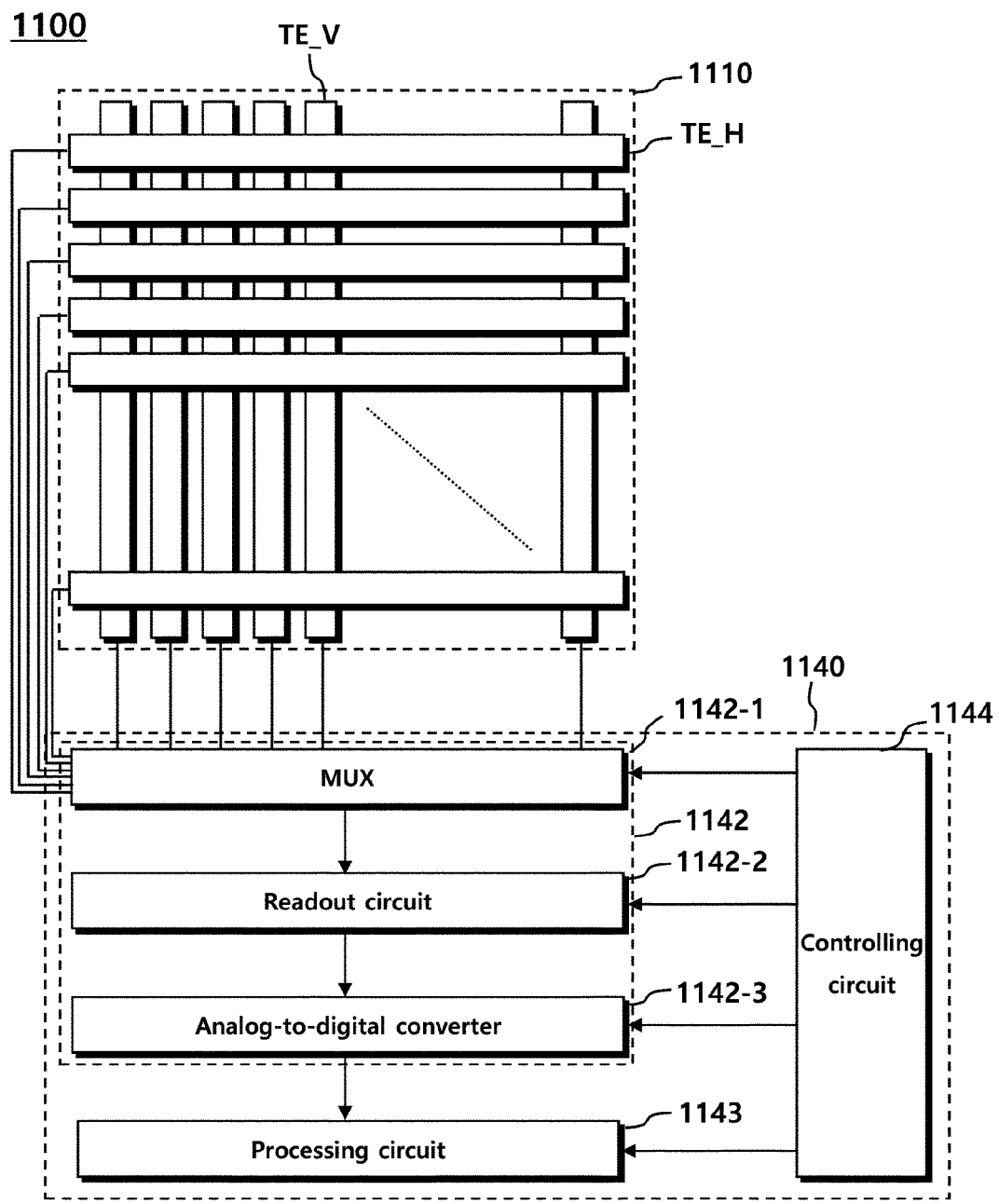
FIG. 11 is a diagram illustrating the configuration of a touch sensing system having a second touch electrode structure according to another embodiment.

FIG. 11 is a diagram illustrating the configuration of a touch sensing system having a second touch electrode structure according to another embodiment.

Referring to FIG. 11, a touch sensing system 1100 may have a second touch electrode structure for sensing a touch in a mutual capacitance method. In the second touch electrode structure, a transmission electrode receiving the driving signal and a reception electrode outputting a response signal are able to be distinguished. A touch electrode for the driving signal and a touch electrode for the response signal may be uniquely formed on the panel 1110.

However, according to another embodiment, the second touch electrode structure may be used to sense a touch by the self-capacitance method. That is, even in the touch electrode structure for the mutual capacitance method, a touch sensing operation may be performed through the self-capacitance method. According to the self-capacitance method in the second touch electrode structure, sensing is performed on one touch electrode and sensing is performed on another touch electrode, and then the intersection of the touch positions derived from respective pieces of touch data may be determined to be a final touch position.

The driving circuit (not shown) may generate a driving signal encoded with a random code and transmit the driving signal to a horizontal touch electrode TE_H and a vertical touch electrode TE_V. The horizontal touch electrode TE_H and the vertical touch electrode TE_V may be formed to cross each other on the panel 1110. In the mutual capacitance method, the vertical touch electrode TE_V may function as an electrode for receiving a driving signal, and the horizontal touch electrode TE_H may function as an electrode for transmitting a response signal, respectively. However, in the self-capacitance method, both the horizontal touch electrode TE_H and the vertical touch electrode TE_V may receive the driving signal and transmit the response signal thereto.

The receiving circuit 1142 may receive the response signal for the horizontal touch electrode TE_H and the response signal for the vertical touch electrode TE_V in sequence. The receiving circuit 1142 may include a MUX 1142-1, a readout circuit 1142-2, and an analog-to-digital converter 1142-3. The readout circuit 1142-2 and the analog-to-digital converter 1142-3 may perform the same functions as those described in the above embodiment.

However, the MUX 1142-1 may select the touch electrode multiple times for one touch sensing. For example, the MUX 1142-1 may select the horizontal touch electrode TE_H and then select the vertical touch electrode TE_V. This is due to the fact that the final touch position may be derived only when the operation for both electrodes is completed.

The processing circuit 1143 may process the response signal for the horizontal touch electrode TE_H and then process the response signal for the vertical touch electrode TE_V. The processing circuit 1143 may decode a first response signal for the horizontal touch electrode TE_H with the same random code as that used in encoding the driving signal, thereby generating a first decoded response signal. The processing circuit 1143 may generate first touch data indicating a first touch position from the first decoded response signal. Then, the processing circuit 1143 may decode a second response signal for the vertical touch electrode TE_V with the same random code as that used in encoding the driving signal, thereby generating a second decoded response signal. The processing circuit 1143 may generate second touch data indicating a second touch position from the second decoded response signal. In this case, the random codes used in encoding and decoding for the horizontal touch electrode TE_H and the vertical touch electrode TE_V may be the same.

In addition, the processing circuit 1143 may determine the intersection of the first touch position and the second touch position to be the final touch position.

Figure 12:
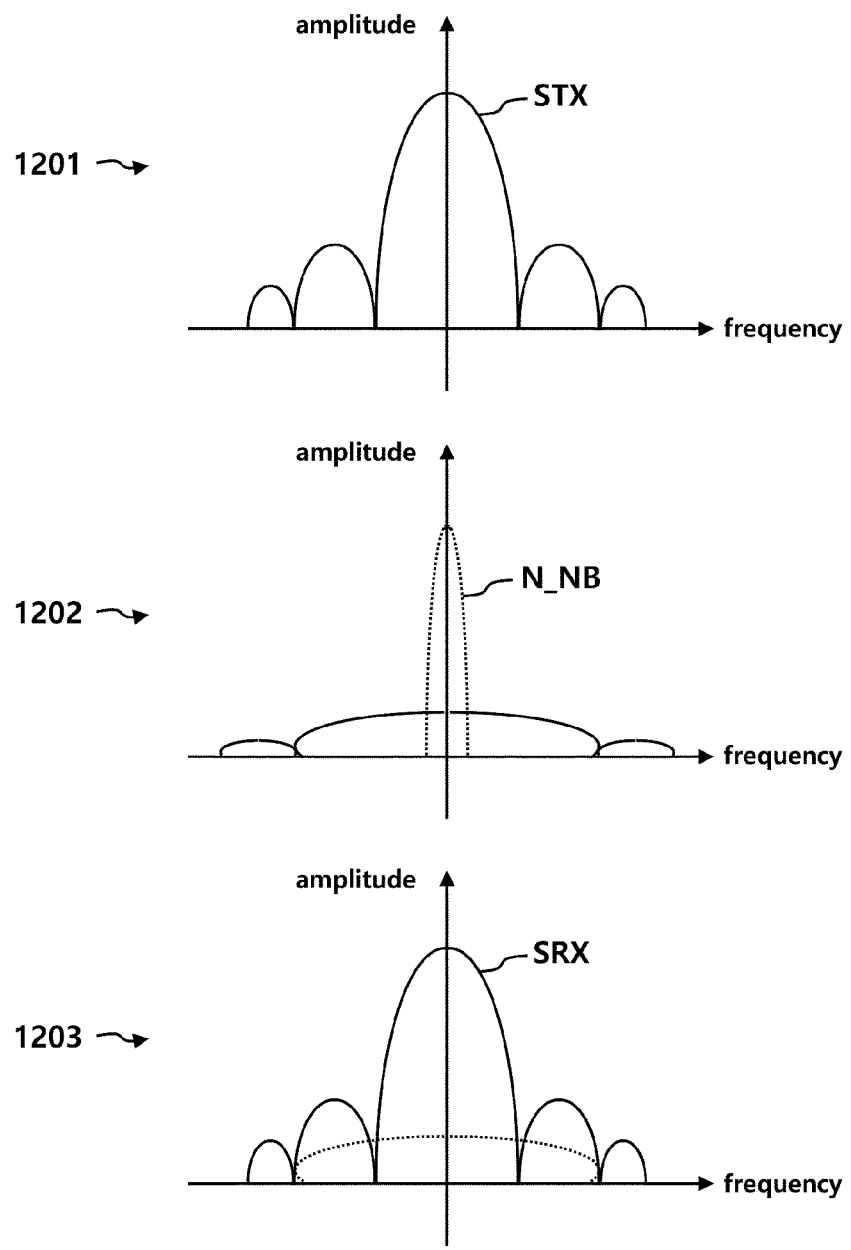
FIG. 12 is a diagram illustrating the removal of narrow-band noise according to an embodiment of the present disclosure.

FIG. 12 is a diagram illustrating the removal of narrowband noise according to an embodiment of the present disclosure.

Referring to FIG. 12, if the driving signal is encoded and the response signal is decoded with the same random code in sensing a touch, the influence of narrowband noise N_NB can be reduced.

If the driving signal STX is not encoded, the driving signal STX may have a broad spectrum in the frequency domain, and may have a large amplitude (see 1201).

When the driving signal STX is encoded with the random code, the spectrum may be broadened and the amplitude may be reduced. In addition, while the driving signal STX is applied to the touch electrode and the response signal SRX is received, narrowband noise N_NB may occur (see 1202).

If the response signal SRX (encoded with the random code) is decoded with the same random code as that used in encoding the driving signal STX, the spectrum may be narrowed, and the amplitude may be increased. At the same time, the narrowband noise N_NB may also be decoded. However, the spectrum of the noise may be broadened, and the amplitude thereof may be reduced. The decoded response signal SRX may have a narrow spectrum and a large amplitude, and thus may be free from the influence of the narrowband noise N_NB (see 1203).

Figure 13:
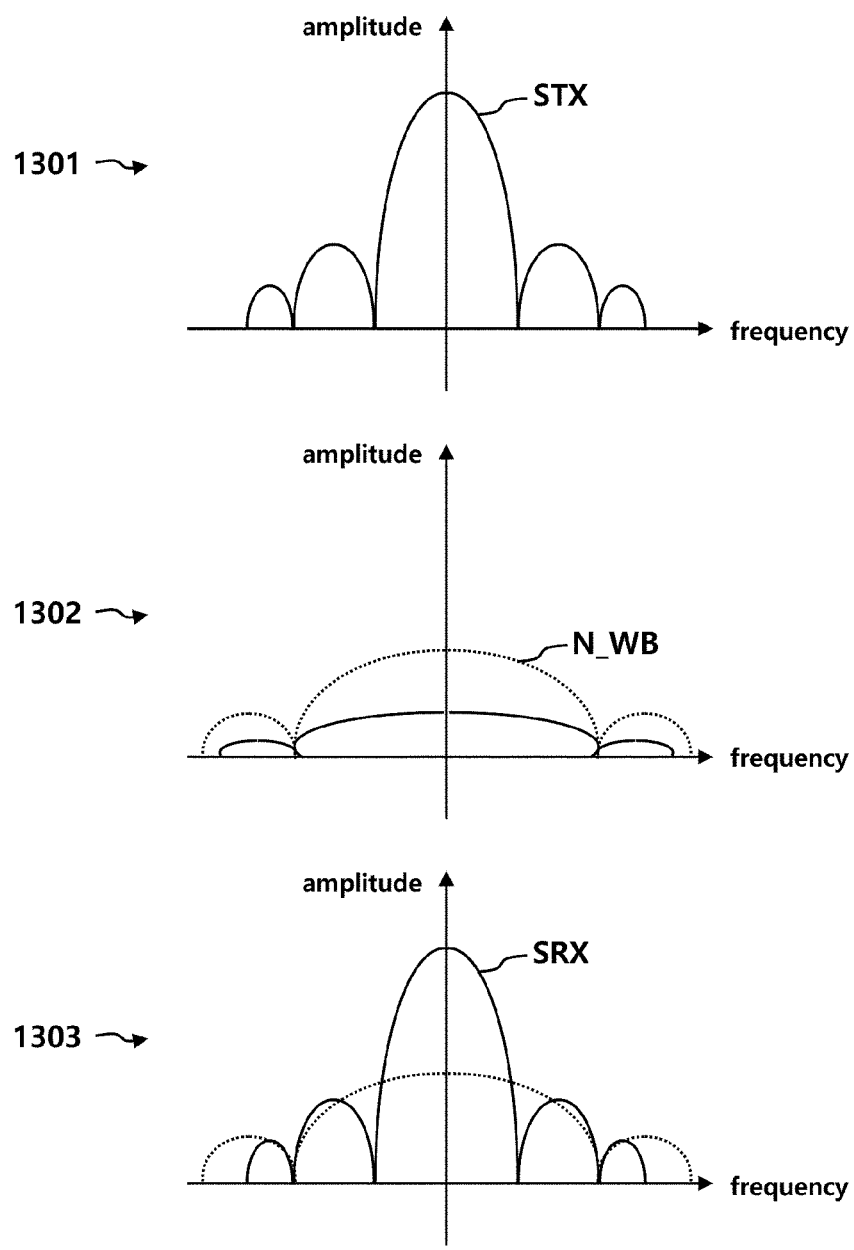
FIG. 13 is a diagram illustrating the removal of wideband noise according to an embodiment of the present disclosure.

FIG. 13 is a diagram illustrating the removal of wideband noise according to an embodiment of the present disclosure.

Referring to FIG. 13, if the driving signal is encoded and the response signal is decoded with the same random code in sensing a touch, the influence of wideband noise N_WB may be reduced.

If the driving signal STX is not encoded, the driving signal STX may have a broad spectrum in the frequency domain, and may have a large amplitude (see 1301).

If the driving signal STX is encoded with the random code, the spectrum may be broadened, and the amplitude may be reduced. In addition, while the driving signal STX is applied to the touch electrode and the response signal SRX is received, wideband noise N_WB may occur (see 1302).

If the response signal SRX (encoded with the random code) is decoded with the same random code as that used in encoding the driving signal STX, the spectrum may be narrowed, and the amplitude may be increased. At the same time, the spectrum and amplitude of the wideband noise N_WB may change through the decoding, but the decoded response signal SRX may have a narrower spectrum and a larger amplitude than the narrowband noise N_NB. The decoded response signal SRX may be free from the influence of the wideband noise N_WB (see 1303).

What is claimed is:

1. A touch sensing device comprising:
   a driving circuit configured to generate a driving signal encoded with a random code and to transmit the driving signal to a touch electrode;
   a receiving circuit configured to receive a response signal to the driving signal from the touch electrode; and
   a processing circuit configured to generate a decoded response signal by decoding the response signal with the same random code used for an encoding and to generate touch data indicating a touch position from the decoded response signal,
   wherein a bandwidth of the driving signal is widened through the encoding.

2. The touch sensing device of claim 1, wherein the decoded response signal has a narrower bandwidth than the driving signal.

3. The touch sensing device of claim 1, wherein the driving signal has a wider bandwidth than noise occurring in a process of sensing a touch and the decoded response signal has a narrower bandwidth than the noise.

4. The touch sensing device of claim 1, wherein the driving circuit generates the driving signal using a logic element that receives a square wave having a specific frequency through one input terminal and receives a value of the random code through the other input terminal.

5. The touch sensing device of claim 4, wherein the logic element outputs a driving control signal and the driving circuit comprises a switching circuit configured to selectively output a high driving voltage and a low driving voltage depending on the driving control signal, thereby generating the driving signal.

6. The touch sensing device of claim 5, wherein a frequency of the driving signal is determined by a specific frequency of the square wave.

7. The touch sensing device of claim 1, wherein the driving circuit generates the driving signal to have different phases depending on a value of the random code.

8. The touch sensing device of claim 7, wherein the driving circuit generates the driving signal such that a dummy section is formed between a plurality of pulses adjacent to each other.

9. The touch sensing device of claim 1, wherein the driving circuit generates the driving signal to have different amplitudes or polarities depending on a value of the random code.

10. The touch sensing device of claim 1, wherein the random code comprises a maximum length sequence (MLS) code, a Barker code, or a gold code.

11. The touch sensing device of claim 1, wherein the receiving circuit comprises a readout circuit configured to analog-convert the response signal and an analog-to-digital converter configured to digitally convert the analog-converted response signal and the processing circuit decodes the digitally converted response signal.

12. The touch sensing device of claim 11, wherein the readout circuit comprises an integrator configured to transmit a value obtained by integrating the response signal to the analog-to-digital converter, wherein the integrator is reset before an edge of the encoded driving signal.

13. A touch sensing device comprising:
a driving circuit configured to generate a driving signal encoded with a random code and to transmit the driving signal to a first touch electrode and a second touch electrode intersecting with the first touch electrode;
a receiving circuit configured to receive a response signal to the driving signal from the first touch electrode and the second touch electrode; and
a processing circuit configured to generate a decoded response signal by decoding the response signal with the same random code used for an encoding and to generate touch data indicating a touch position from the decoded response signal.

14. The touch sensing device of claim 13, wherein the processing circuit determines an intersection point of a first touch position included in a first response signal received from the first touch electrode and a second touch position included in a second response signal received from the second touch electrode to be the touch position.

15. The touch sensing device of claim 13, wherein the driving circuit encodes a first driving signal for the first touch electrode and a second driving signal for the second touch electrode with the same random code.

* * * * *